United States Patent [19]
Schwartz et al.

[11] Patent Number: 6,152,371
[45] Date of Patent: Nov. 28, 2000

[54] METHOD AND APPARATUS FOR DECODING BAR CODE SYMBOLS

[75] Inventors: Eric D. Schwartz, Skaneateles; Vivian L. Hunter, Baldwinsville; Dennis W. McEnery, Marcellus; James L. Canale, Homer, all of N.Y.

[73] Assignee: Welch Allyn, Inc., Skaneateles Falls, N.Y.

[21] Appl. No.: 09/133,083

[22] Filed: Aug. 12, 1998

[51] Int. Cl.⁷ .................................................. G06K 9/22
[52] U.S. Cl. .................... 235/462.45; 235/454; 235/472; 235/459; 359/558; 359/559
[58] Field of Search .................... 235/462, 472, 235/459, 469, 470, 454; 359/558, 559, 724, 564, 565; 356/124.5; 382/210, 213, 211, 254

[56] References Cited

U.S. PATENT DOCUMENTS

| | | | |
|---|---|---|---|
| 5,294,783 | 3/1994 | Hammond, Jr. et al. | 235/462.01 |
| 5,386,105 | 1/1995 | Quinn et al. | 235/462.01 |
| 5,430,285 | 7/1995 | Karpen et al. | 235/472 |
| 5,521,695 | 5/1996 | Cathey, Jr. et al. | 356/4.01 |
| 5,646,391 | 7/1997 | Forbes et al. | 235/462.01 |
| 5,748,371 | 5/1998 | Cathey, Jr. et al. | 359/558 |
| 5,756,981 | 5/1998 | Roustaei et al. | 235/462.01 |
| 5,773,806 | 6/1998 | Longacre, Jr. | 238/462.01 |
| 5,773,810 | 6/1998 | Hussey et al. | 235/472 |

*Primary Examiner*—Thien M. Le
*Assistant Examiner*—Daniel Felten
*Attorney, Agent, or Firm*—Wall Marjama Bilinski & Burr

[57] ABSTRACT

A method and apparatus for reading and decoding one-dimensional (1D) bar code symbols. A 1D bar code symbol is imaged by an optical assembly which includes a cubic phase mask that causes the optical transfer function of the optical assembly to remain approximately constant over a range of distances between the apparatus and the symbol to be read. An electrical representation of the resulting image is converted to a smoothly varying analog image signal. A transition identifying circuit processes the analog image signal, without first applying a recovery function that takes into account the effect of the phase mask, and generates a binary signal which is used to decode the symbol.

24 Claims, 6 Drawing Sheets

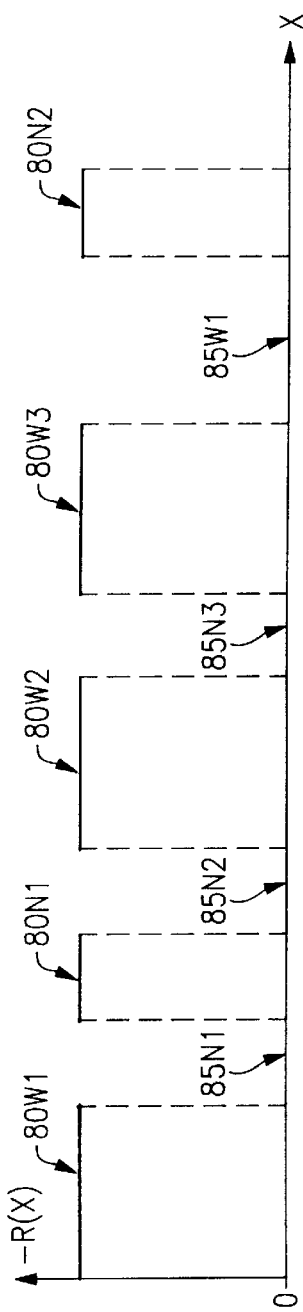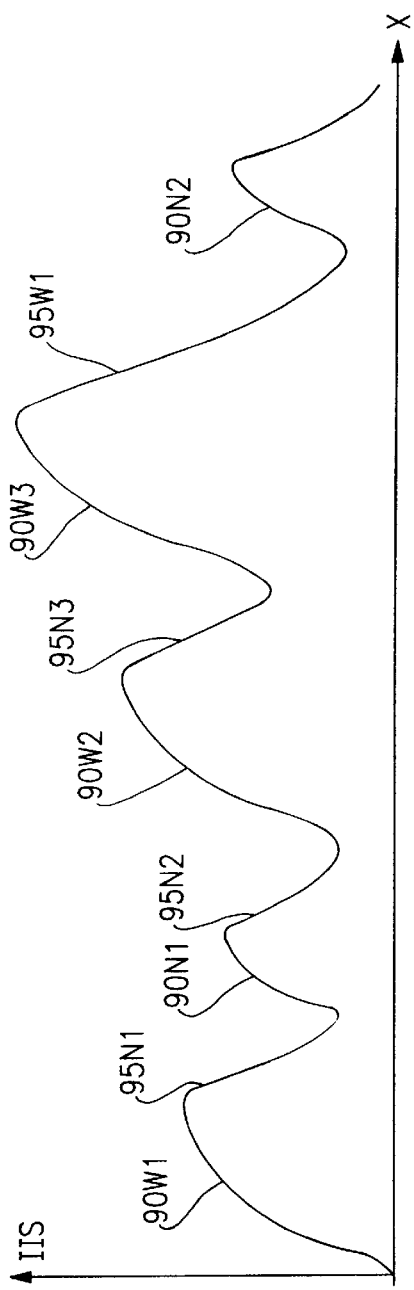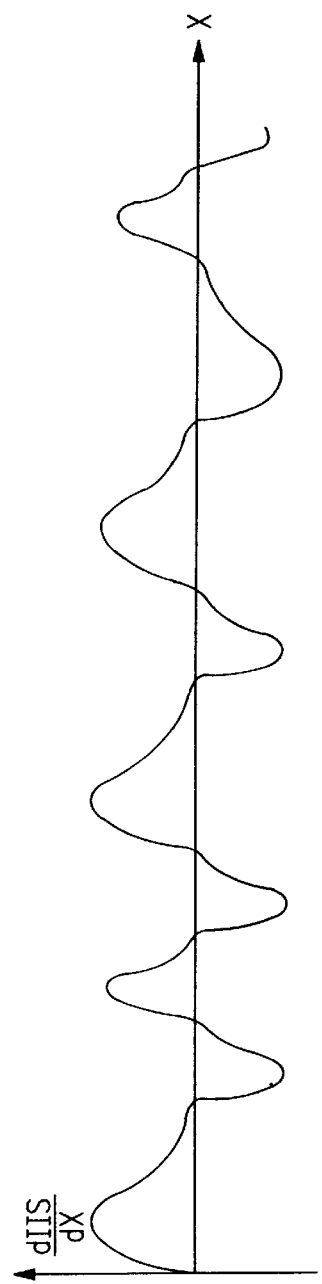

METHOD AND APPARATUS FOR DECODING BAR CODE SYMBOLS

BACKGROUND OF THE INVENTION

The present invention relates to a method and apparatus for decoding one-dimensional (1D) bar code symbols, and is directed more particularly to a method and apparatus for decoding 1D bar code symbols that have been imaged by 1D imaging-type bar code readers which have optical assemblies that include cubic phase masks.

1D bar codes, also known as linear bar codes, have become so widely used in point-of-sale, inventory control, shipment tracking, and other applications that many types of optical readers and optical reading systems have been developed to accommodate them. Generally speaking, these optical readers and reading systems may be divided into two broad types. A first of these types, known as laser scanning readers, makes use of a laser beam which is swept across the symbol to be read. In such readers, the intensity of the light reflected back from the target is measured by a photodetector. The output of the photodetector is then digitized, often in real time, to produce a digital signal for use in decoding the bar code symbol. A second of these types, referred to herein as imaging-type bar code readers, make use of an unswept, elongated illuminating beam. In readers of this type, an image of the target is formed on a 1D image sensor, which may be of any of a variety of types, including CCD and CMD image sensors, among others. When the imaging process is complete, the output signal of the image sensor is binarized to produce a two state signal for use in decoding the bar code symbol.

An important consideration in the design of both types of 1D optical readers is their ability to resolve the bars and spaces of the target in spite of changes in the distance between the reader and its target, i.e., to provide a good resolution over a substantial depth of field. In practice, laser scanning bar code readers usually provide a greater resolution and a greater depth of field than imaging-type bar code readers. This is because laser beams can be formed into narrow beams, and because their photodetectors need not include image forming optical elements. While the depth of field that can be achieved with imaging-type bar code readers can be increased by reducing the size of their apertures, such reductions give rise to other problems, such as reduced image intensity and an increase in aperture related diffraction effects. The depth of field that can be achieved with laser scanning bar code readers is also limited, however, since laser beams tend to spread as they propagate, and thereby progressively lose their ability to resolve closely spaced bars and spaces.

Prior to the present invention, a number of attempts have been made to improve the resolution and depth of field of both laser scanning and imaging bar code readers, some of which have involved the use of phase masks. In the case of laser scanning readers, phase masks have been used to shape the laser beam so as to hold the width thereof relatively constant over the desired depth of field. An example of a laser scanning reader which includes such a phase mask is shown and described in U.S. Pat. No. 5,646,391 (Forbes et al).

In the case of imaging-type bar code readers, the use of phase masks to improve depth of field is more complex. In such readers phase masks are included in the imaging optical assemblies to make the Optical Transfer Functions (OTFs) of those optical assemblies relatively invariant over the required depth of field. Because the images formed on the image sensors of these optical assemblies (often referred herein to as intermediate images) are the result of the superposition of the point spread functions (PSFs) of the points of the objects being imaged, they are too distorted to be used for their intended purpose without first being converted to final images that were corrected for the effect of the phase mask. One way of making this correction was to deconvolve the incoherent OTF of the phase mask from the intermediate image signal produced by the image sensor. An apparatus of this general type which is suitable for use in general purpose imaging systems is shown and described in U.S. Pat. No. 5,748,371 (Cathey, Jr. et al).

An apparatus of the last mentioned general type which is specially adapted for use in imaging-type bar code readers is shown and described in copending U.S. patent application Ser. No. 09/113,523, filed Jul. 10, 1998 (Hammond), which is commonly assigned herewith. In the latter application, an improved, generalized recovery function is used to correct a frequency domain representation of the intermediate image signal, and the result transformed back into the spatial domain to produce a final image signal. This final image signal is then digitized in order to place it in a form in which it may be decoded. While readers of this type produce excellent results, particularly when used with optical assemblies that are optimized for bar code reading applications, they have the disadvantage that they must be able to apply the Discrete Fast Fourier Transform (DFFT) and Inverse Discrete Fast Fourier Transform (IDFFT), and to multiply and divide large numbers of complex numbers. Providing a reader with the ability to perform these operations not only greatly increases the complexity of the reader software, it also slows down the reading process and thereby decreases the reader's overall data throughput rate.

In view of the foregoing, it will be seen that there exists a need for an imaging-type optical reader which has a large depth of field, but which does not achieve this depth of field by using complex mathematical operations that substantially reduce the reader's overall data throughput rate.

SUMMARY OF THE INVENTION

In accordance with the invention there is provided a method and apparatus for decoding 1D bar code symbols that have been imaged over an extended depth of field through a cubic or near cubic phase mask, which does not have the above-described disadvantages. In both its method and its apparatus aspects the present invention is based on the discovery that, while the intermediate image signal produced by a 1D optical reader which includes a cubic phase mask would, if displayed, bear little resemblance to the final image signal that can be recovered therefrom after post-processing with a suitable recovery function, it retains sufficient edge information for it to be decoded without first being converted to a final image signal. As a result, the method and apparatus of the invention allows 1D bar code symbols to be decoded substantially directly from their intermediate image signal representations, without the complex and time-consuming post-processing that has been thought to be necessary.

In its method aspect, the present invention contemplates the imaging of a 1D bar code symbol through an optical assembly that includes a cubic or near cubic phase mask that renders the optical transfer function (OTF) of that optical assembly relatively invariant as a function of the working distance between the optical assembly and its target symbol or, equivalently, relatively invariant as a function of the misfocus error of the optical assembly. As this optical assembly forms an image of its target on an image sensor, each point of the symbol in the object plane is replaced by a corresponding point spread function (PSF) in the image plane. Since these PSFs can be complex and extend over a considerable distance, and since the resulting, intermediate image is the summation of these PSFs, the intermediate image lacks sharply defined transitions.

Significantly, however, it has been discovered that the spatially periodic structure of 1D bar code symbols causes the above-mentioned summation to occur in a way that gives rise to a intermediate image signal that has a shape or envelope that develops in a predictable manner as a function of the distance from the last bar-to-space or space-to-bar transition. Although this shape will vary somewhat from reader to reader, depending on the design of its optical system, any particular reader will produce an intermediate image signal that includes features which form patterns that are characteristic of the bars and spaces of the symbol represented thereby. In accordance with the invention, these patterns, and the stage to which they are developed, are used substantially in real time to estimate the locations of the bar-to-space or space-to-bar transitions of the symbol as imaged. Once the latter step has been performed for a sufficient number of bar code elements, the symbol may be decoded in a conventional manner.

In the preferred embodiments of the invention the estimation step is preceded by the step of converting the intermediate image signal from its usual stepwise continuous form to an actually continuous form which makes its transitions easier to localize. This may, for example, be accomplished by processing the intermediate image signal with a low pass filter that is designed to remove substantially only the steps. The first derivative of the filtered signal may then be taken to more sharply define the points at which the original signal reverses direction. The resulting signal may then be converted to a two state signal by a suitable binarizing circuitry. More generally, however, the invention my be practiced by using any of a variety of different pattern recognition techniques that able to identify symbol features, such as bars and spaces or bar-to-space transitions, from the intermediate image signal patterns that are characteristic thereof.

In its apparatus aspect, the present invention comprises an imaging-type optical reader which differs from conventional 1D readers in two significant ways. One of these is the inclusion in the optical assembly of the reader a cubic or near cubic phase mask that causes the OTF thereof to remain approximately constant over the depth of field over which the reader is to be used. The other of these is the inclusion in the signal processing circuitry of the reader of circuitry for identifying the transitions of an imaged symbol, from the intermediate image signal representation thereof, substantially in real time, and with only minimal signal pre-processing. This transition identifying circuitry may take the form of hard-wired circuitry that includes a differentiating or derivative taking circuit together with a zero crossing detector circuit. It may also take the form of a digital signal processor circuit that has a stored program that includes a suitable transition identifying routine. Together, this phase mask and transition identifying circuitry or software enable a 1D optical reader to provide decoded data, from symbols read over a large depth of field, with a speed and accuracy that represent a significant improvement over previously known types of 1D readers.

DESCRIPTION OF THE DRAWINGS

Other objects and advantages of the invention will be apparent from the following description and drawings, in which:

FIG. 5A shows the reflectance profile for a part of a hypothetical 1D bar code symbol;

FIG. 5B shows the intermediate image signal which corresponds to the reflectance profile of the bar code symbol of FIG. 5A;

FIG. 5C shows a signal that varies in accordance with a first derivative of the intermediate image signal of FIG. 5C.

DESCRIPTION OF THE PREFERRED EMBODIMENTS

Figure 1:
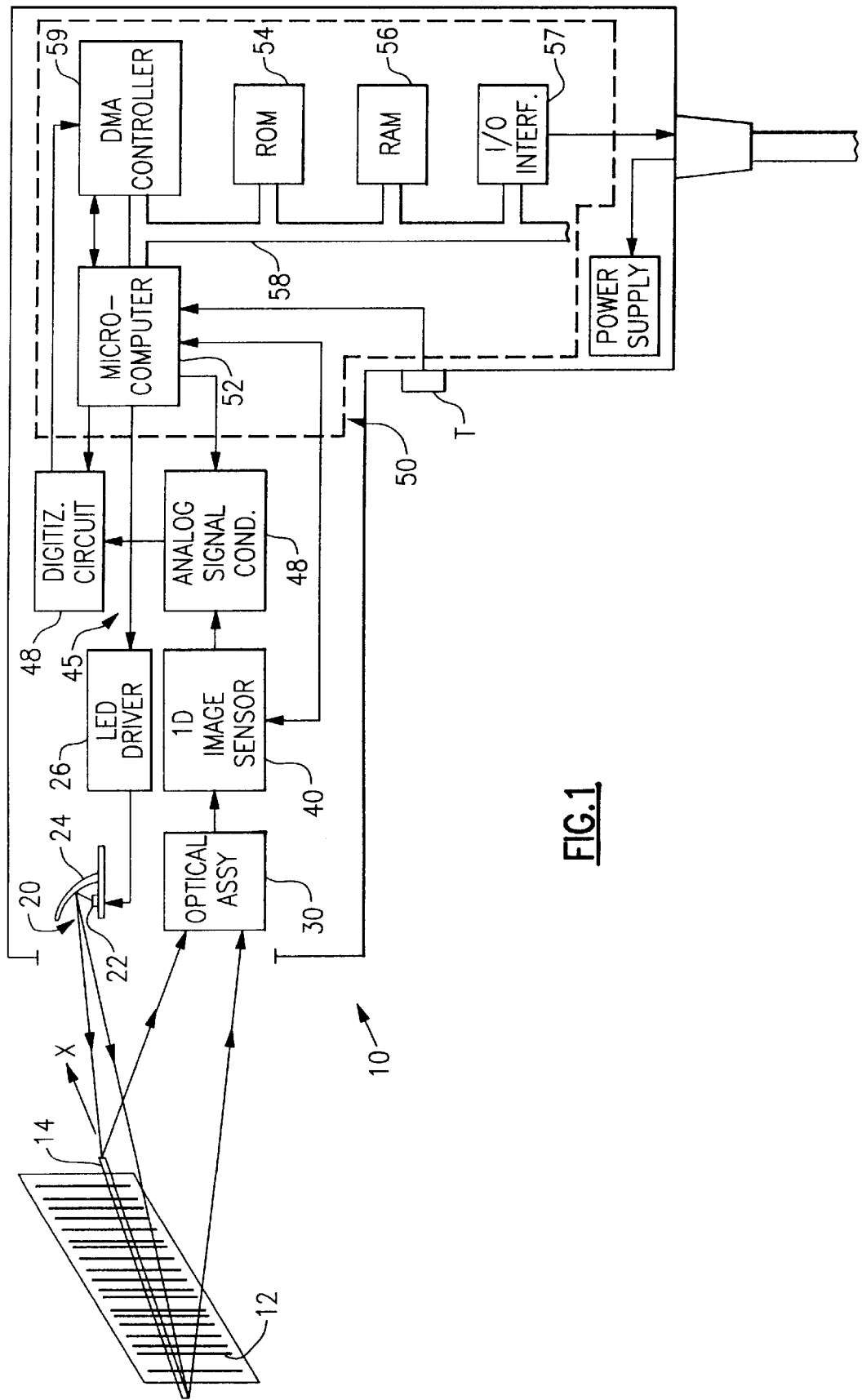
FIG. 1 is an optical-electronic block diagram of one embodiment of a 1D optical bar code reader constructed in accordance with the present invention.

Referring to FIG. 1 there is shown an optical-electronic block diagram of a 1D hand held imaging type bar code reader 10, together with an exemplary 1D bar code symbol 12 that is located in an object plane, not numbered. In the embodiment of FIG. 1, this reader includes an illumination system 20 for projecting a line of light on bar code symbol 12 and thereby illuminating a 1D slice 14 thereof To the end that this may be accomplished, illumination system 20 may include a linear array of LEDs 22 and a focusing mirror 24 together with a suitable LED driver circuit 26. An illumination system of this type is shown and described in U.S. Pat. No. 5,430,285 (Karpen et al), which is commonly assigned herewith and, accordingly, will not be further described herein.

Reader 10 of FIG. 1 also includes an optical assembly 30 for forming an intermediate image of at least a 1D slice 14 of symbol 12, the word "intermediate" here being used to distinguish this image, which includes distortions resulting from misfocus error and the presence of phase mask 36, from the final, corrected image that readers known in the art produce from this image by post-processing with a recovery function. Reader 10 also includes an image sensor 40 for receiving that intermediate image and converting it to an intermediate image signal, usually abbreviated herein to IIS. Exemplary embodiments of optical assembly 30 and image sensor 40 will be described more fully later in connection with FIGS. 2A and 2B.

The remaining circuitry of FIG. 1 processes the IIS and produces therefrom the data encoded in bar code symbol 12. This remaining circuitry includes a transition identifying circuit 45 which may comprise an analog signal conditioning circuit 46 and a digitizing circuit 48, a digital signal processor or DSP 50, which typically includes a microcomputer 52, a read only memory (ROM) 54, a read write memory (RAM) 56, and a bus 58 for interconnecting them. a suitable DMA controller 59 may also be included in order to handle the storage of image data, thereby allowing microcomputer 52 to concentrate on decoding data presented thereto. The operation of the reader of FIG. 1 is typically initiated either manually, by means of a suitable trigger T, or non-manually by means of an autotrigger arrangement.

The overall operation of the reader of FIG. 1 is controlled by a program stored in ROM 54. Generally speaking, this program includes a reader control portion and a decoding portion but, as will be explained more fully later, no recovery function processing portion. The reader control portion of the program deals with matters such as the starting and stopping of scanning, and the inputting and outputting of data via an I/O interface 57. The decoding portion deals with matters such as identifying the symbology used in the symbol being read and the decoding of that symbol in accordance with the rules that govern that symbology. Because programs for performing these functions are included in commercially available readers, such as the model number ST 3400 bar code reader manufactured Welch Allyn, Inc., they will not be discussed in detail herein.

Figure 2A:
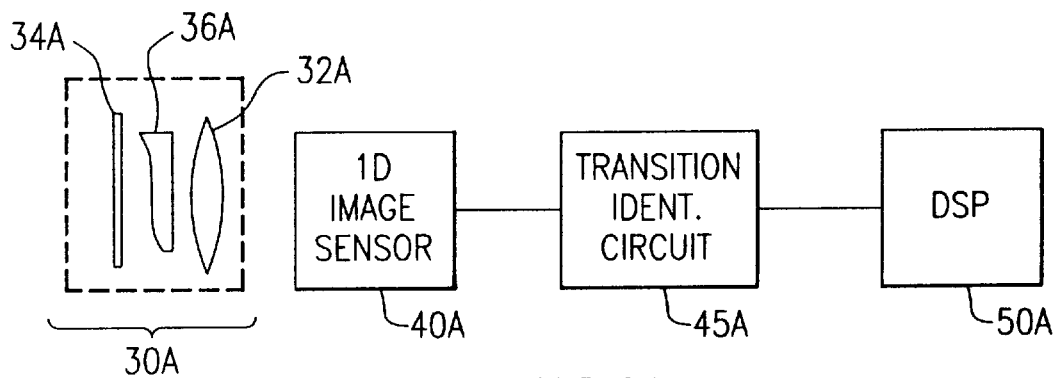
FIGS. 2A and 2B are optical-electronic block diagrams of two embodiments of imaging systems suitable for use in the reader of FIG. 1.
Figure 2B:
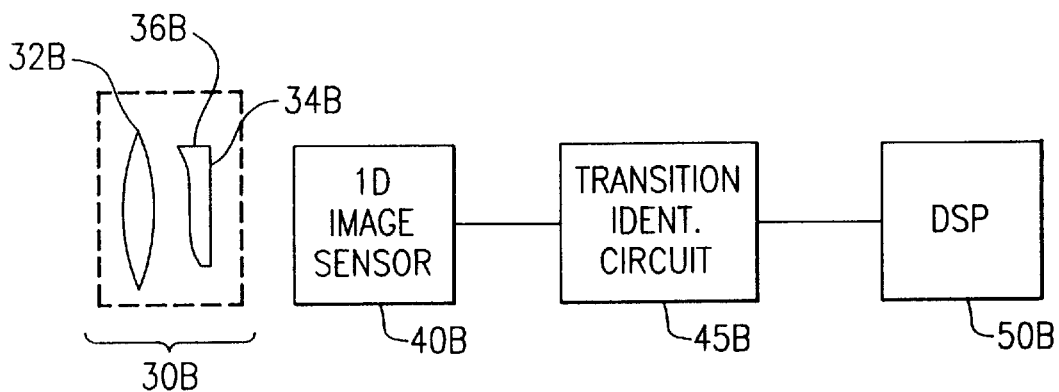

Referring to FIGS. 2A and 2B, there are shown two embodiments of imaging systems which are suitable for use in practicing the method and apparatus of the invention. In the embodiment of FIG. 2A, the imaging system includes an optical assembly 30A having a lens assembly 32A, an aperture 34A, and a phase mask 36A. The imaging system of FIG. 2A also includes a 1D optoelectronic image sensor 40A for receiving the real intermediate image of object 12 formed thereon by optical assembly 30A, and converting that light image into an IIS for application to transition identifying circuit 45A and DSP 50A.

Lens assembly 32A may include one or more lenses or equivalent focusing structures for receiving light from the object to be imaged and forming that light into an image on the photosensitive elements that form the active surface of image sensor 40A. Although image sensor 40A is preferably a 1D image sensor, lens assembly 32A may be either a 1D or a 2D lens assembly, and is preferably a 2D lens assembly.

Aperture 34A of optical assembly 30A may be a clear aperture defined either by a separate, stand alone aperture stop or by the lateral dimensions of one of lens assembly 32A or phase mask 36A. Alternatively, aperture 34A may be a shaded or "soft" aperture defined by an amplitude mask, such as a Gaussian amplitude mask, that has a transmittance that decreases smoothly as a function of the distance from the optical axis of the reader. Although such amplitude masks play important roles in the optical assemblies of some optical readers which are designed to exhibit a substantial depth of field, they are not essential to the practice of the present invention. It will therefore be understood that the present invention may, but need not, include a Gaussian amplitude mask or other apodizing structure.

Phase mask 34A may be placed at or near the front principal plane of lens 32A, and is designed to cause the Optical Transfer Function (OTF) of the optical assembly of FIG. 2A to remain approximately constant over a predetermined range of reader to target distances. In the preferred embodiment, the coefficients of the cubic or third order polynomial function are selected according to the maximum misfocus error that the imaging system is designed to accommodate, and are preferably sufficient to compensate for that misfocus error.

The phase mask and amplitude mask (if used) of the optical assembly may also be located at or near the rear principal plane of the lens, as shown in FIG. 2B, which is otherwise similar to that of FIG. 2A, like functioning parts being similarly numbered, except for a change in postscript. In the embodiment of FIG. 2B, however, amplitude mask 34B comprises a coating on one surface of phase mask 36B, rather than a stand alone element. a number of other alternative lens and mask configurations may also be used in optical assembly 30, and will be understood to be within the contemplation of the invention.

Sensor 40A may be any of a number of different types of optoelectronic image sensors, including CCD, CID and CMOS image sensors, among others. Sensor 40A should have enough photosensitive elements to provide a resolution sufficient to meet the requirements of the application in which the imaging system is used. For most 1D bar code reading applications, an image sensor having an imaging array with 600 or more photosensitive elements is sufficient.

The voltages output by the photosensitive elements of image sensor 40A taken together comprise an IIS that corresponds to the intermediate image formed on the active surface of the image sensor. While the intermediate image itself is coherent and continuous, the IIS is incoherent and discontinuous, and is made up of a plurality of discrete output voltage values.

These output voltage values may, for example, take the form of a sequence of analog voltage values that the sample-and-hold circuitry of the image sensor causes to appear at the output thereof as image data acquired during each scan is shifted out at the end of that scan. Depending on the type of image sensor used, these output voltage values may also take the form of a sequence of digital gray scale values. Whatever their form, the magnitudes of these voltages varies with the time averaged value of the superpositions of the squares of the absolute values of those parts of the point spread functions (PSFs) of all points of the object that are incident on the corresponding photosensitive elements.

Figure 3A:
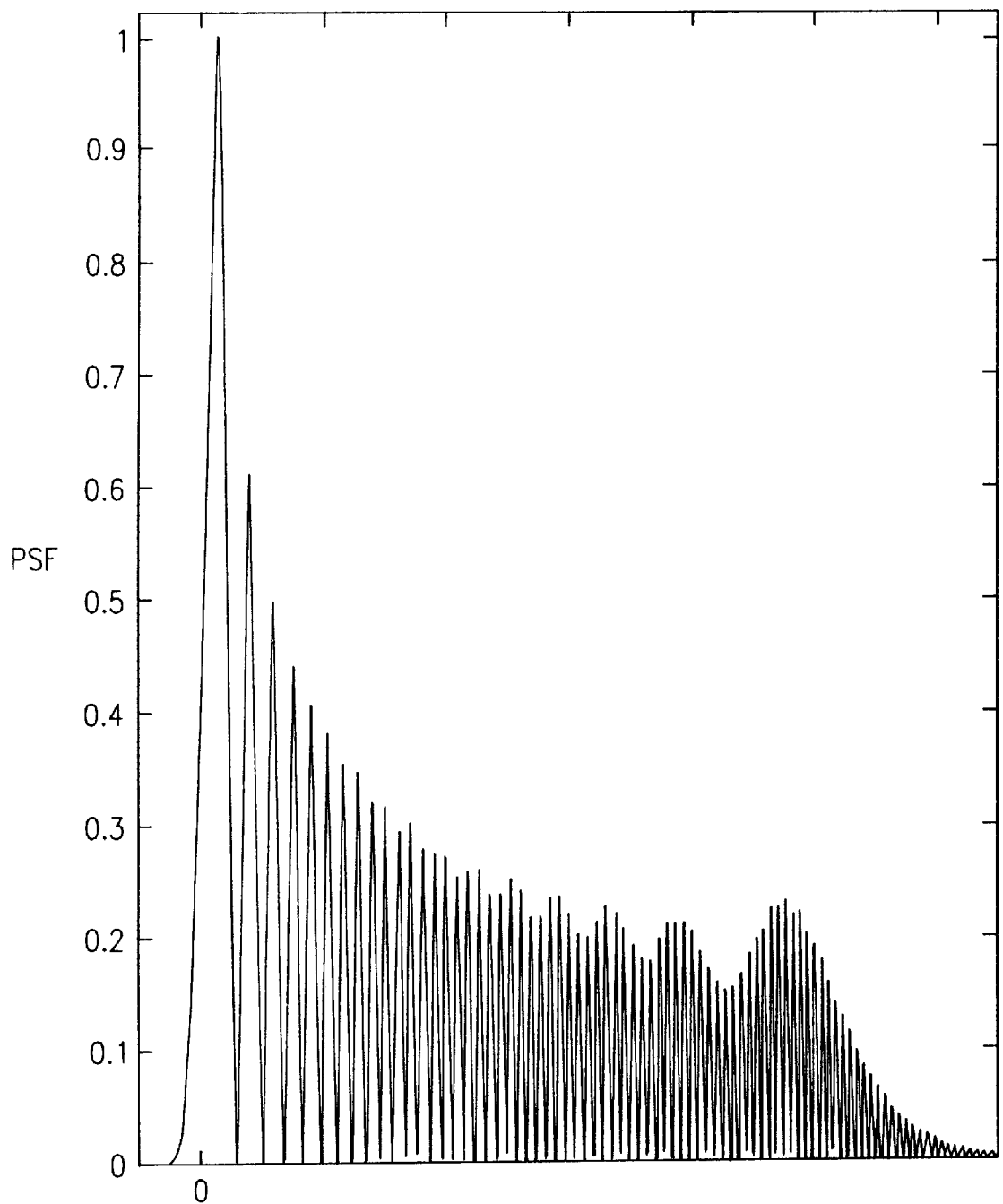
FIGS. 3A and 3B shown the in-focus point spread functions for two optical assemblies which include cubic or near cubic phase masks.
Figure 3B:
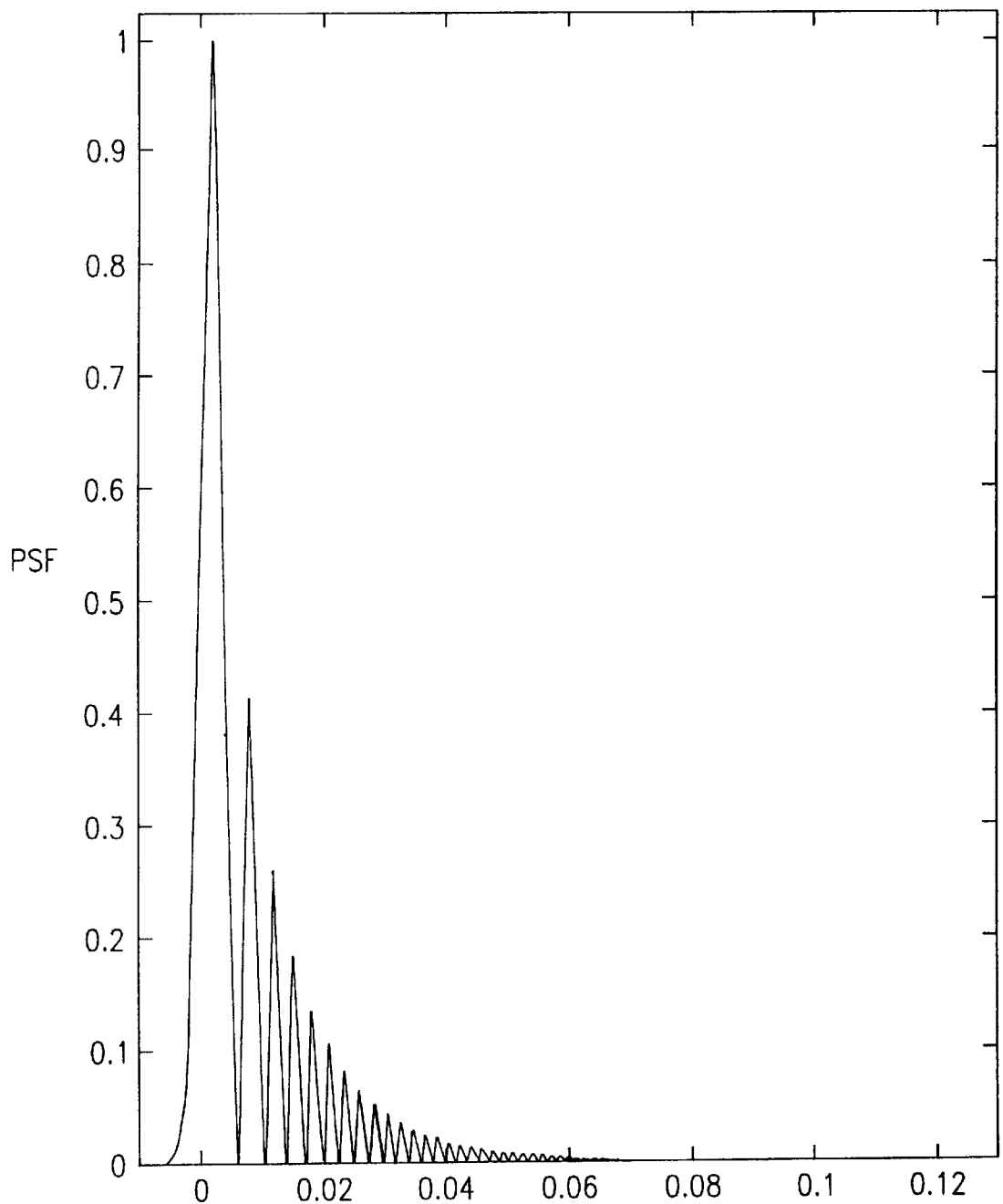

The shape of an exemplary in-focus PSF for an optical assembly which includes a cubic phase mask and has a clear aperture is shown in FIG. 3A. The shape of an exemplary in-focus PSF for an optical assembly which includes a cubic phase mask and has a Gaussian amplitude mask is shown in FIG. 3B. As may be seen by comparing the PSFs of FIGS. 3A and 3B, the PSF of an optical assembly which includes a Gaussian amplitude mask is considerably more simple and compact than the PSF of an optical assembly which does not include such a mask. This greater compactness and simplicity facilitates the task of processing the IIS with a recovery function or other digital reconstruction algorithm to produce a final image that is corrected for misfocus error over the depth of field for which the optical assembly was designed. As a result, bar code readers which use phase masks to deal with misfocus error have been thought to require the use of both recovery functions and Gaussian amplitude masks.

In accordance with the present invention, it has been discovered that the advantages of using a cubic phase mask may be realized, for 1D bar code reading applications, without using a Gaussian amplitude mask, and without producing a corrected final image signal. More particularly, it has been discovered that a 1D bar code symbol may be decoded substantially directly from the IIS, without converting the latter into a final image signal, if the IIS is processed in a way that allows the locations of bar-to-space and space-to-bar transitions to be identified with sufficient accuracy to allow the symbol to be decoded. As will be explained more fully later, the latter determination is possible because of the discovery that, in spite of the distortions that are present in IISs, the latter signals have a structure that evolves in such a predictable way as a function of distance that the underlying bar-to-space and space-to-bar transitions may be recognized directly therefrom.

Figure 4B:
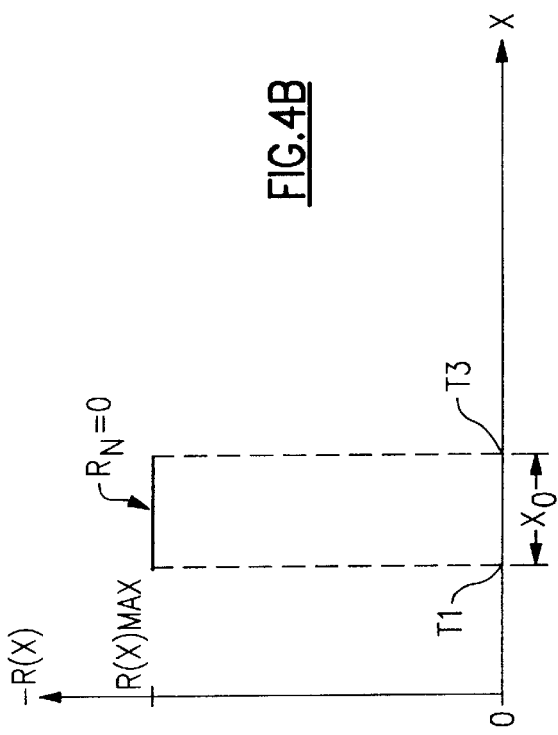
FIGS. 4A and 4B, respectively, show the reflectance profiles of exemplary wide and narrow bars of the type used in 1D bar code symbols.
Figure 4D:
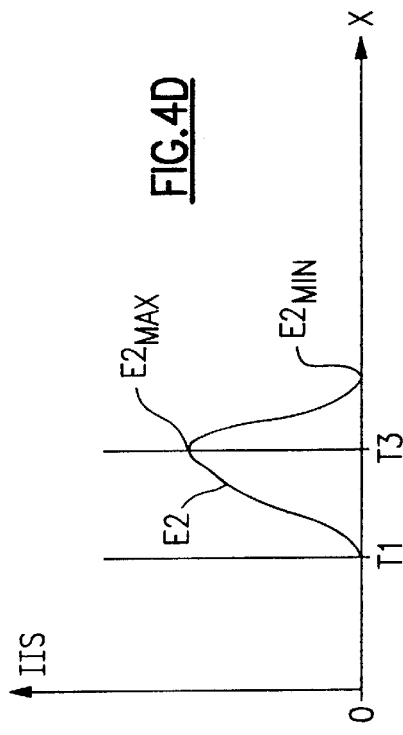
FIGS. 4C and 4D show the intermediate image signals which correspond to the reflectances of FIGS. 4A and 4B, respectively.
Figure 4A:
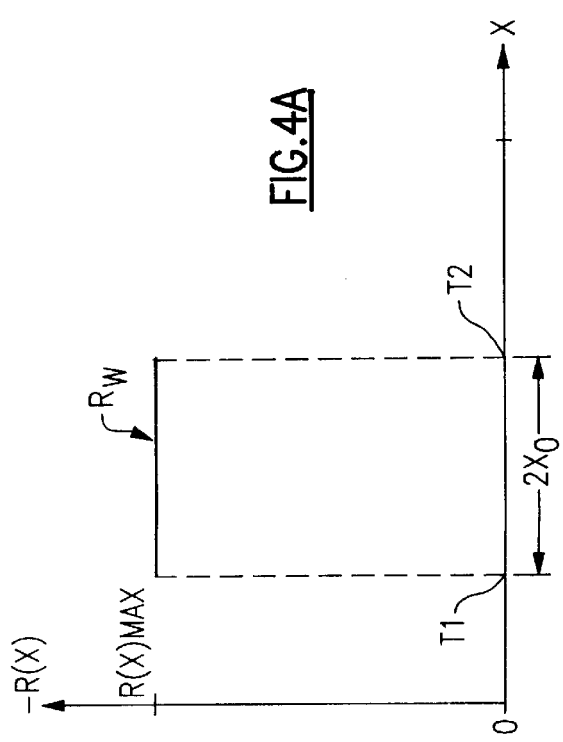

Referring to FIGS. 4A and 4B there are shown idealized reflectance signals $R_W$ and $R_N$ which represent the intensities of light reflected from single wide and narrow dark bars, respectively, of the type that are included in 1D bar code symbols, such as symbol 12 of FIG. 1. These reflectance signals (which, for convenience, are shown with their signs reversed, i.e., so that black bars are associated with high reflectance values) have a maximum value $R(X)_{MAX}$, which corresponds to the reflectance that would be measured if an ideal black bar were imaged onto an ideal image sensor by an ideal optical assembly under a condition of optimum focus, and by a minimum value $R(X)_{MIN}$ that corresponds to the reflectance that would be measured under the same conditions for an ideal white bar or space, $R(X)_{MIN}$ here being assumed to be zero. To more clearly show the X-axis positions of the transitions, T1–T2 and T1–T3, that begin and end the reflectance signals of FIGS. 4A and 4B, these X-axis positions are marked with dotted vertical lines. The latter lines are dotted because they are not themselves parts of reflectance signals $R_W$ and $R_N$, which are, ideally, discontinuous one-dimensional line segments.

In FIG. 4A the reflectance signal $R_W$ has a width $2X_O$ which is twice that of reflectance signal $R_N$ of FIG. 4B, a two-to-one width relationship which is typical of that which exists between the wide and narrow bars of bar code symbols in most 1D bar code symbologies. Because these reflectances represent bars as imaged, and not as printed, the widths $2X_0$ and $X_0$ are dependent both on the actual widths of the bars as printed and on the characteristics of the optical assemblies through which these printed bars are imaged. In order to avoid repeatedly distinguishing between these kinds of widths, the term "width" will be used without making this distinction, and will be understood to refer to the spatial dimension X of a representation of a bar code symbol, either as printed or as imaged, as indicated by the context.

If the characteristics of the optical assembly do not vary as a function of distance from its optical axis, the intermediate image which appears on image sensor 40 will be the convolution of the ideal object with the PSF of each of its points. If the ideal object is a 1D representation (or slice) of a bar code element such as that shown in FIG. 4A or FIG. 4B, and if the PSF of each point on that object has the form shown in FIG. 3B, this intermediate image will cause image sensor 40 to produce IISs which (in the spatial domain) have the shapes shown in FIGS. 4C and 4D, respectively. Because the image sensor has a finite number of discrete photosensitive elements, these IISs are actually made up of a plurality of discrete signal voltage values (not shown). In such stepwise continuous signals, the signal magnitude does not vary smoothly, but includes no times at which the signal magnitude is undefined.

Prior to the present invention, the stepwise continuousness of the IIS was preserved and used in the generation of a final, corrected image signal from which the symbol of interest was decoded. This was accomplished by taking the Discrete Fast Fourier Transform (DFFT) of the discrete values and then processing the resulting DFFT with a recovery function and an Inverse DFFT (IDFFT) to produce a discrete final image signal. As will be explained more fully presently, the preferred embodiment of the present invention processes the IIS as a continuous signal, and the latter is preferably low pass filtered to make it more nearly approximate a signal that is step-free or has analog continuity. This step-free approximation of the IIS is then processed to identify the locations of the bar-to-space and space-to-bar transitions, without using signal transforms or recovery functions. Once this has been done, the locations of these transitions (or counts derived therefrom) are themselves used as the information from which the symbol of interest is decoded.

The simplified processing contemplated by the present invention is based on the discovery that, if the optical assembly is shift invariant along the direction along which a 1D bar code symbol is read, then the IIS may be thought of as the summation of a plurality of identical, concatenated PSFs that are located at equally spaced intervals. With objects, such as 1D bar code symbols, which are characterized by sharply defined transitions that are spaced at intervals that are multiples of a standard spatial unit, such a summation results in an IIS that is bounded by an envelope or signal profile that evolves in a predictable manner as a function of its position in relation to the transitions of the object, as imaged on the active surface of the image sensor. The IIS that is produced in the presence of a single isolated wide black bar code element, such as one having the reflectance shown in FIG. 4A, for example, is bounded by signal envelope E1 of FIG. 4C. Similarly, the IIS that is produced in the presence of a single isolated narrow black bar code element, such as one having the reflectance shown in FIG. 4B, is bounded by signal envelope E2 of FIG. 4D. For the sake of clarity, the stepwise continuous character of the IISs from which signal envelopes E1 and E2 are derived are not shown in FIGS. 4B and 4D.

Figure 4C:
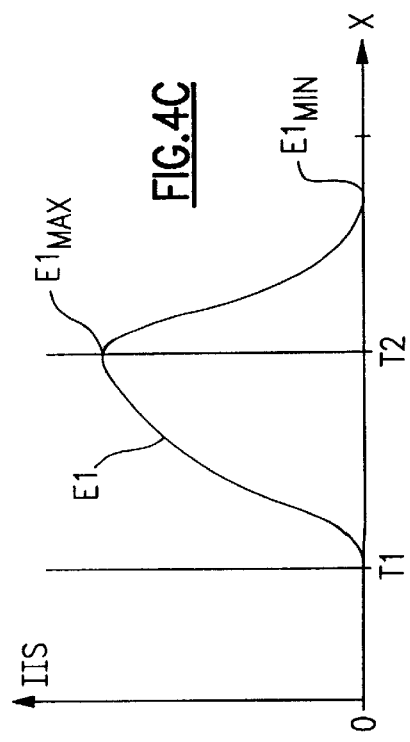

Referring to FIG. 4C, it will be seen that signal envelope E1 begins to increase from an assumed starting value of 0 at a location that coincides with transition T1 of FIG. 4A, and initially increases rapidly. This initial increase is rapid because the PSFs for the points of the object that are located at and immediately after transition T1 all have high intensities, such as those shown at the left of FIGS. 3A and 3B, and add together strongly. As the distance from transition T1 becomes greater, signal E1 increases less rapidly, even though the high intensity portions of the PSFs of new points on the object are being added, because the PSFs of the points in proximity to transition T1 are smaller at greater distances. If the distance from transition T1 were sufficiently great, signal envelope E1 would eventually reach a plateau or saturation value. Since, in FIG. 4A, an oppositely directed transition T2 occurs before this plateau is reached, however, signal E1 reaches a maximum value $E1_{MAX}$ that is less than its saturation value, and then begins to decline. This decline occurs because, after transition T2, there are no new PSFs to offset the decline in the original PSFs that occurs with increasing distance from transition Ti. The decline in E1 continues until it reaches a minimum value $E1_{MIN}$ which, because there are no further transitions, is the same as its starting value of 0.

Referring to FIG. 4D, it will be seen that the IIS that is associated with the imaging of a single isolated narrow black bar is bounded by a signal envelope E2 which has a shape that is generally similar to that of FIG. 4C, except that it is less fully developed at the time it changes from increasing to decreasing. This less developed shape reflects that fact that the IIS that underlies envelope E2 stopped increasing when the difference between it and its saturation value was greater than in the case of the IIS that underlies envelope E1 of FIG. 4C.

In view of the foregoing, it will be seen that, when readers that include suitable phase masks image 1D bar code symbols, they produce IISs that increase in a predictable manner as a function from distance from a transition of one type, and decrease in a predictable manner as a function of distance from a transition of the opposite type. Stated differently, the IIS representation of a bar is characterized by a segment that changes in a first direction from a starting value to a final or saturation value across the width of the bar, and the IIS representation of a space is characterized by a segment that changes in the opposite direction from a starting value to a final or saturation value across the width of the space. Significantly, because of the presence of the phase mask, changes in the distance between the reader and its target have little effect on this pattern of development.

Because the shapes of the IIS envelopes, such as E1 and E2, are determined by the sizes and shapes of the PSFs that give rise to them, an optical assembly that includes a suitable phase mask will produce an IIS envelope that has a particular, characteristic shape, over a sizable range of working distances. This characteristic shape may be developed to greater or lesser degrees, depending on the widths of the bar code elements as imaged on the image sensor, but will, for given bar and space widths and a given PSF, be the same from one bar code symbol to the next. While the exact size and shape of the PSF affects the shapes of the IIS envelopes that are associated therewith, it does not affect the repeatability of those shapes at each stage of the development thereof. As a result, even without using optical elements, such as Gaussian amplitude masks, that cause PSFs to have specific sizes and shapes, and without processing an IIS with a recovery function, it is possible, for any optical assembly that includes a suitable phase mask, to determine the locations of the transitions of a bar code symbol entirely from the sizes and shapes of the signal segments that are included in the IIS representation thereof. It is this discovery that allows readers constructed in accordance with the present invention to produce results comparable to or better than those produced by previously known readers, and to do so without incurring the cost of using the structures and techniques that were regarded as essential to the success of those readers.

The manner in which the locations of the transitions of a multi-element bar code symbol may be identified directly from the filtered IIS signal representation thereof will now be discussed with reference to FIGS. 5A, 5B and 5C. Referring first to FIG. 5A, there is shown the idealized intensity of light reflected from a portion of an exemplary bar code symbol that includes bars and spaces which have only one or the other of two different widths. As in the case of FIGS. 4A through 4D, the light is expressed as a reflectance as a function of distance R(X), and includes a sign reversal that causes high intensity values to be associated with black bars. Reflectance R(X) includes three segments 80W1 through 80W3 which correspond to wide black bars, two segments 80N1 and 80N2 which correspond to narrow black bars, three segments 85N1 through 85N3 which correspond to narrow white bars or spaces, and a single segment 85W3 which corresponds to a wide white bar or space.

Referring to FIG. 5B there is shown the envelope of the IIS that is produced when the reflectance of FIG. 5A is imaged by an imaging system of the type shown in FIG. 1. Unlike the IIS of FIGS. 4A through 4D, which is made up of curved segments which start from and return to zero, the IIS of FIG. 5B is made up of curved segments which generally begin and end at non-zero values. The increasing IIS segment 90N1 that is associated with narrow black bar 80N1, for example, begins not at a value of 0, but rather at the value at which the prior IIS segment 95N1 ended. Similarly, decreasing IIS segment 95N3 begins at the value that prior IIS segment 90W2 ended, and so on.

From the above-described examples it is apparent that, in general, the IIS for any 1D bar code symbol that is imaged with a reader constructed in accordance with the invention will be made up of a sequence of alternating concatenated curved segments, each of which begins where the prior segment (if any) ended, i.e., at a point that corresponds to a bar code transition of one type, and which ends at a final value that corresponds to a bar code transition of the opposite type or at the end of the symbol. Since the junctions of these segments occur at the maxima and minima of the IIS, i.e., the parts of the IIS where sudden changes in direction occur, the latter can be used to locate the transitions of the imaged bar code relative to one another. Since these relative locations are all that is necessary for a successful decoding of a 1D symbol, it will be seen that a reader which includes a suitable phase mask, and which is able to recognize the above-described segment pattern, will be able to produce decodable data without using the amplitude masks and/or recovery functions that were regarded as essential in readers known prior to the present invention.

The reader of the present invention may identify the locations of the transitions of a bar code symbol from the IIS representation thereof in any of a variety of different ways. It may, for example, compare an IIS to a series of signal templates as it is shifted out of the image sensor and, from the results of the comparison, determine the total number, lengths and relative positions of the segments included therein. As this is done, the reader may eliminate those segments that are too short or too long to be consistent with the width relationships of known 1D bar code symbologies. Excessively short segments, for example, are likely to represent signal noise, while excessively long segments are likely to represent light reflected from regions that are located beyond the ends of the bar code symbol. Once the segments have been identified, the transitions which gave rise to them may be located by locating their ends. The resulting transition data, or a timercount derived therefrom, may then be processed using conventional autodiscrimination routines to decode the data encoded in the original symbol.

The reader of the present invention may also determine the locations of the transitions of a bar code symbol by identifying the maxima and minima of its IIS representation. In the preferred embodiment this is accomplished after the IIS has been processed to accentuate the these maxima and minima as, for example, by differentiating or taking one or more derivatives thereof. FIG. 5C shows the result of taking a first derivative of the IIS of FIG. 5B. Since the maxima and minima of the IIS coincide with the ends of its constituent segments, and since the maxima and minima are points where the slope of the IIS signal is equal to zero, the locations of the zero crossings of the differentiated IIS signal of FIG. 5C correspond to the locations of the transitions of the bar code symbol as imaged. As a result, the differentiated IIS signal need only be binarized or converted to a two-state signal to place it in a form in which it, or a timercount derived therefrom, can be decoded.

Figure 6:
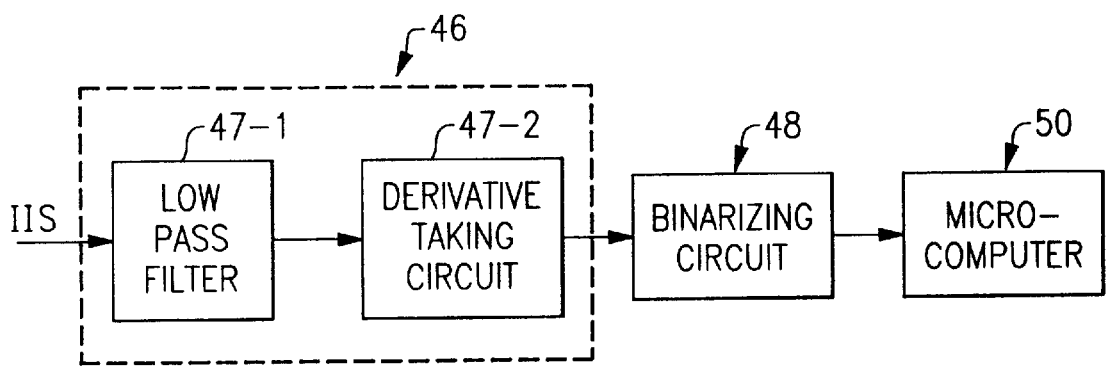
FIG. 6 is a block diagram of one embodiment of a transition identifying circuit that is suitable for use with the present invention.

Referring to FIG. 6 there is shown a block diagram of signal processing circuitry which is suitable for use in the last described embodiment. The circuitry of FIG. 6 includes an analog signal processing circuit 46 which comprises a low pass filter circuit 47-1 and a derivative taking or differentiating circuit 47-2. Low pass filter 47-1 is preferably arranged to filter the IIS only to the degree necessary to convert it into smoothly varying signal, i.e., a signal from which the voltage steps introduced by the sample-and-hold circuitry of the image sensor and noise have been eliminated, but which otherwise closely tracks the light variations of the intermediate image. Differentiating circuit 47-2 receives this filtered IIS and takes at least a first derivative thereof, thereby eliminating any of its DC components and converting its maxima and minima into zero crossings. Since both low pass filters and differentiating circuits are well known to those skilled in the art, the particulars of these circuits will not be discussed in detail herein.

The signal processing circuitry of FIG. 6 also includes a digitizing or binarizing circuit 48 for converting the output signal of analog signal processing circuit 46 into a two state signal suitable for use by microcomputer 50. Circuit 48 may include one or more comparator circuits which are provided with switching thresholds which cause them to change states in response to zero crossings. Since binarizing circuits are well known to those skilled in the art, binarizing circuit 48 will not be discussed in detail herein.

An alternative signal processing approach is shown and described in U.S. Pat. No. 5,294,783, which is commonly assigned herewith and which is hereby incorporated by reference. In the latter patent a piecewise linear approximation of the image sensor output is used in conjunction with linear interpolation to identify the locations of the transitions. It will therefore be seen that the present invention is not limited to the use of analog techniques, such as low pass filtering, to process the waveshape of the IIS in order to make the location of its transitions easier to identify.

A still different way of producing the transition data necessary to decode 1D bar code symbols may be used if the reader is of the type that has an imaging system that includes a 2D phase mask and a 2D image sensor. In such readers, a 1D symbol is imaged as a 2D object and the image data for the 2D object as a whole (as opposed a 1D slice thereof) is stored in RAM. Once so stored, 1D slices of the image data may be taken as necessary and converted, usually with subpixel interpolation, into stepwise continuous 1D representations of the target symbol. Such stepwise continuous 1D representations may then be processed in generally the same way as the earlier discussed 1D representations to identify the transitions thereof with an accuracy that is sufficient for decoding. A reader which is equipped to produce and process such 1D slices, albeit without the phase mask of the invention, is described in commonly assigned U.S. Pat. No. 5,773,806, which is hereby incorporated by reference.

On receiving transition location data, however produced, microcomputer 50 preferably times the intervals between the transitions thereof by counting the number of clock pulses therebetween. These counts together comprise a timercount representation of the bar code as imaged. It is this, timercount representation which most 1D decoding algorithms use to decode target symbols. As will be apparent to those skilled in the art, however, it is unimportant whether the available transition information, once produced, is or is not converted to a timercount representation, or whether the decoding itself is carried out by a microcomputer that is located in the same housing as the imaging system, as in the case of hand held reader 10 of FIG. 1, or in an associated host processor to which the hand held portion of the apparatus is coupled via an I/O interface, such as I/O interface 57 of FIG. 1.

In view of the foregoing, it will be seen that there are a variety of different circuits and/or stored program steps which are able to produce, substantially directly from the image signal of an imaging system constructed in accordance with the invention, transition location or timercount data that is sufficiently accurate to be used in decoding 1D bar code symbols. It will therefore be understood that the above-described signal processing circuits and techniques are exemplary only and that, in its broadest aspect, the processing aspects of the present invention encompasses all means or steps for producing a decodable representation of an image signal that is generated by an imaging system which includes a phase mask without first creating a final image that is corrected for the distortions resulting from the presence of that phase mask.

While the present invention has been described with reference to a number of particular embodiments, it will be understood that the true spirit and scope of the invention should be determined only with reference to the appended claims.

What is claimed is:

1. An apparatus for optically reading and decoding data encoded in a linear bar code symbol that includes a plurality of data transitions, including, in combination:

a. an optical assembly for forming an image of said symbol, said optical assembly including a phase mask for causing the optical transfer function of said optical assembly to remain approximately constant over a range of distances between said apparatus and said symbol;

b. an imaging device including a plurality of discrete photosensitive elements for receiving said image and converting said image into an image signal, said image signal being a stepwise continuous signal;

c. transition identifying means responsive to said image signal for generating a digitized signal which provides data indicative of the locations of said transitions, without first applying to said image signal a recovery function that takes into account the effect of said phase mask, said transition identifying means including a low pass filter for approximately filtering out the steps of said stepwise continuous signal; and d. decoding means for decoding said data from said digitized signal.

2. The apparatus of claim 1 in which said apparatus is a hand held apparatus having a housing adapted to be held by a human hand, and in which said decoding means is located within said housing.

3. The apparatus of claim 1 in which said transition identifying means includes waveshaping means for reshaping said image signal to more sharply define those portions thereof which correspond to said transitions.

4. The apparatus of claim 3 in which said waveshaping means includes low pass filtering means for converting said image signal into a smoothly varying signal, and derivative taking means for taking at least one derivative of said smoothly varying signal.

5. The apparatus of claim 1 in which said transition identifying means includes means for finding the maxima and minima of said image signal, and for generating said digitized signal in accordance with said maxima and minima.

6. The apparatus of claim 1, further including a memory, in which a representation of said image signal is stored in said memory, and in which said digitized signal is generated with reference to said stored representation.

7. The apparatus of claim 1 in which said optical assembly has an optical axis and defines an aperture having a transmittance that decreases smoothly as a function of the distance from said optical axis.

8. The apparatus of claim 1 in which said phase mask is an approximately cubic phase mask.

9. An apparatus for optically reading and decoding data encoded in a linear bar code symbol that includes a plurality of data transitions, including, in combination:

a. an optical assembly for forming an intermediate image of said symbol, said optical assembly including a phase mask for causing the optical transfer function of said optical assembly to remain approximately constant as the misfocus error of said optical assembly changes;

b. an imaging sensing device for receiving an intermediate image of aid symbol from said optical assembly and converting said image into an intermediate image signal, said intermediate image signal being a stepwise continuous signal;

c. signal processing circuitry for receiving said intermediate image signal and generating, substantially directly therefrom, transition data indicative of the relative locations of said transitions, said signal processing circuitry including circuitry for converting said stepwise continuous signal into an analog signal, and circuitry responsive to said analog signal for producing a two state signal that includes said transition data; and d. decoding circuitry for decoding said data from said transition data.

10. The apparatus of claim 9 in which said apparatus is a hand held apparatus having a housing adapted to be held in a human hand, and in which said decoding circuitry is located within said housing.

11. The apparatus of claim 9 in which said signal processing circuitry includes waveshaping circuitry for reshaping said intermediate image signal to accentuate the locations of the transitions thereof.

12. The apparatus of claim 9 further including differentiating circuitry for taking at least one derivative of said analog signal, and circuitry responsive to said differentiating circuitry for producing a two state signal.

13. The apparatus of claim 9 in which said signal processing circuitry includes means for locating the maxima and minima of said intermediate image signal, and for generating said transition data from the locations of said maxima and minima.

14. The apparatus of claim 9 in which said optical assembly has an optical axis and includes an amplitude mask having a transmittance that decreases as a function of the distance from said optical axis.

15. The apparatus of claim 9 in which said phase mask is an approximately cubic phase mask.

16. A method for recovering data encoded in a linear bar code symbol that includes a plurality of transitions, including the steps of:

a. providing an optical assembly that includes a phase mask which causes said optical assembly to have an optical transfer function which is approximately constant over a range of distances between said optical assembly and said symbol;

b. providing an imaging device;

c. operating said imaging device to receive an image of said symbol through said optical assembly and convert said image into an image signal, said image signal being a stepwise continuous image signal;

d. determining the locations of said transitions from said image signal, without first producing from said image signal a final image signal that is corrected with a recovery function that varies in accordance with said phase mask, wherein said step of determining includes the steps of (i) filtering said image signal to produce a filtered image signal which is approximately step free;

(ii) differentiating said filtered image signal to produce a differentiated image signal; and (iii) identifying said locations from said differentiated signal; and e. decoding said data from the results of said determining step.

17. The method of claim 16 in which said image signal has maxima and minima that correspond the locations of said transitions, and in which said determining step includes the steps of processing said image signal to determine the locations of said maxima and minima, and producing a two state signal the states of which are indicative of the locations of said transitions.

18. The method of claim 16 in which said image signal includes a plurality of concatenated segments, and in which said converting step includes the step of generating said two state signal in accordance with the numbers and types of said segments.

19. The method of claim 16 including the further step of including in said optical assembly an amplitude mask having a transmittance that decreases smoothly as a function of the distance from the center thereof.

20. A method for recovering data encoded in a 1D bar code symbol that includes a plurality of transitions, including the steps of:

a. providing an optical assembly that includes a lens and a phase mask, said phase mask being configured sl that said optical assembly produces an image the misfocus error of which is relatively constant over a working range of distances between said optical assembly and said symbol;

b. providing an imaging device;

c. operating said imaging device to receive said image and convert said image into an image signal, said image signal being a stepwise continuous signal;

d. converting said image signal into a two state signal without correcting said image signal to take into account the effect of said phase mask, wherein said converting step includes processing said image signal to produce a generally step free representation thereof; and e. decoding said data from said two state signal.

21. The method of claim 20 in which said representation has a plurality of maxima and minima, and in which said converting step includes the steps of:

determining the locations of said maxima and minima; and producing a decodable representation of said symbol from the locations of said maxima and minima.

22. The method of claim 20 in which said representation has a plurality of zero crossings indicative of the locations of said transitions, and in which said converting step includes the steps of:

determining the locations of said zero crossings; and producing a decodable representation of said symbol from the locations of said zero crossings.

23. The method of claim 20 in which said image signal includes a plurality of concatenated segments, and in which said converting step includes the step of generating said two state signal in accordance with the numbers and types of said segments.

24. The method of claim 20 including the further step of including in said optical assembly an amplitude mask having a transmittance that decreases continuously as a function of the distance from the center thereof.

* * * * *